United States Patent
Grago, Jr. et al.

(10) Patent No.: US 7,726,736 B1
(45) Date of Patent: Jun. 1, 2010

(54) CAR SEAT REMINDER SYSTEM

(76) Inventors: John Grago, Jr., 1212 Deer Run, Winter Springs, FL (US) 32708; Lalon Grago, 1212 Deer Run, Winter Springs, FL (US) 32708

( * ) Notice: Subject to any disclaimer, the term of this patent is extended or adjusted under 35 U.S.C. 154(b) by 0 days.

(21) Appl. No.: 11/964,378

(22) Filed: Dec. 26, 2007

(51) Int. Cl.
 *A47C 1/08* (2006.01)
 *A47D 15/00* (2006.01)

(52) U.S. Cl. ............... 297/250.1; 297/468; 297/463.2; 24/3.2

(58) Field of Classification Search ............ 297/250.1, 297/468, 463.2, 464; 24/3.2, 3.6; 280/801.1, 280/735; 340/457.1, 667
See application file for complete search history.

(56) References Cited

U.S. PATENT DOCUMENTS

| | | | |
|---|---|---|---|
| 4,592,157 A * | 6/1986 | Kerr | 40/634 |
| 4,760,715 A * | 8/1988 | Ramos, Jr. | 63/5.2 |
| 5,027,477 A * | 7/1991 | Seron | 24/3.4 |
| 5,596,312 A * | 1/1997 | Fowler et al. | 340/457.1 |
| 5,724,920 A * | 3/1998 | Meisman et al. | 119/771 |
| 5,765,875 A * | 6/1998 | Rowley | 283/74 |
| 6,318,610 B1 * | 11/2001 | Doherty | 224/271 |
| 6,634,064 B2 * | 10/2003 | Finotti | 24/198 |
| 7,009,522 B2 * | 3/2006 | Flanagan et al. | 340/666 |
| 7,012,533 B2 | 3/2006 | Younse | |
| 7,123,157 B2 | 10/2006 | Best | |
| 7,230,530 B1 | 6/2007 | Almquist | |
| 2007/0095870 A1 * | 5/2007 | Griffith et al. | 224/219 |
| 2008/0036581 A1 * | 2/2008 | Bunims | 340/457.1 |

* cited by examiner

*Primary Examiner*—David Dunn
*Assistant Examiner*—Erika Garrett

(57) ABSTRACT

A supplemental tongue is fabricated of a rigid material. The supplemental tongue has upper and lower ends. The supplemental tongue is positionable within a slot of a child car seat. The supplemental tongue has a recess. The recess is provided adjacent to the lower end. The recess has a lower linear edge. In this manner the supplemental tongue is retained within the slot. A wrist band is provided in a loop. The loop forms an opening for a wrist. The wrist band is coupled to the tongue.

1 Claim, 3 Drawing Sheets

US 7,726,736 B1

CAR SEAT REMINDER SYSTEM

BACKGROUND OF THE INVENTION

1. Field of the Invention

The present invention relates to a car seat reminder system and more particularly pertains to insuring the use of child car seats by care providers in a safe, convenient and economical manner.

2. Description of the Prior Art

The use of car seat systems of known designs and configurations is known in the prior art. More specifically, car seat systems of known designs and configurations previously devised and utilized for the purpose of using child car seats through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 7,012,533 issued Mar. 14, 2006 to Younse relates to an Occupant Detection and Notification System for Use with a Child Car Seat. U.S. Pat. No. 7,123,157 issued Oct. 17, 2006 to Best relates to a Car-Seat Occupied Baby-On-Board Indicator Alarm. Lastly, U.S. Pat. No. 7,230,530 issued Jun. 12, 2007 to Almquist relates to a Child Seat Safety System for Vehicles.

While these devices fulfill their respective, particular objectives and requirements, the aforementioned patents do not describe a car seat reminder system that allows for insuring the use of child car seats by care providers in a safe, convenient and economical manner.

In this respect, the car seat reminder system according to the present invention substantially departs from the conventional concepts and designs of the prior art, and in doing so provides an apparatus primarily developed for the purpose of insuring the use of child car seats by care providers in a safe, convenient and economical manner.

Therefore, it can be appreciated that there exists a continuing need for a new and improved car seat reminder system which can be used for insuring the use of child car seats by care providers in a safe, convenient and economical manner. In this regard, the present invention substantially fulfills this need.

SUMMARY OF THE INVENTION

In view of the foregoing disadvantages inherent in the known types of car seat systems of known designs and configurations now present in the prior art, the present invention provides an improved car seat reminder system. As such, the general purpose of the present invention, which will be described subsequently in greater detail, is to provide a new and improved car seat reminder system and method which has all the advantages of the prior art and none of the disadvantages.

To attain this, the present invention essentially comprises a car seat reminder system which provides tactile and auditory reminders to the care giver. First provided is a child car seat. The car seat is adapted to receive and support a child in a vehicle. The car seat buckle mechanism has a slot. The slot is adapted to removably receive a primary tongue at an end of a seat belt. In this manner a child is safely retained in the child car seat. The slot has an associated button. The button is adapted to be depressed by a care provider. In this manner a primary tongue is released at an end of a seat belt. Further in this manner a child is allowed to be secured to and released from the child car seat.

A supplemental tongue is provided. The supplemental tongue is removably positionable in the slot when a child is not in the child car seat. The supplemental tongue is fabricated of a rigid metallic material. The supplemental tongue has an upper end. The supplemental tongue has a lower free end. The supplemental tongue is positionable within the slot by a care provider. The supplemental tongue has a recess. The recess is provided adjacent to the lower free end. The recess has a lower linear edge. The recess is co-operable with the button. In this manner the supplemental tongue is retained within the slot when the button is not depressed. The supplemental tongue has a central hole. The central hole is provided adjacent to the upper end.

Provided next is a wrist band. The wrist band is constructed of a spiraled resilient, flexible material. The spiraled wrist band is provided in a loop shaped configuration. The spiraled loop forms an opening. The wrist band is adapted to be stretched. A hand of a care giver is provided. A wrist of a care giver is provided. In this manner the wrist band may be stretched over the hand of a care giver while donning onto the wrist and while removing from the wrist.

Further provided is a rigid ring. The rigid ring passes through the opening of the wrist band and the hole in the supplemental tongue. In this manner the supplemental tongue is coupled to the wrist band. In this manner the wrist band is adapted to be removed from a wrist of a care giver and the supplemental tongue inserted into the slot when the child car seat is not occupied by a child. In this manner the supplemental tongue is adapted to be removed from the slot. Also in this manner the wrist band is adapted to be positioned onto a wrist of a care giver when the child car seat is occupied by a child. Further in this manner the care giver is reminded in a tactile manner that a child is in the child car seat and not to be left unattended.

Provided last is an identification tag. The identification tag has indicia text. The indicia text is provided on at least one surface. The identification tag has a corner hole. The identification tag has a secondary ring. The secondary ring extends through the rigid ring and the corner hole. In this manner the identification tag is coupled to the wrist band. The wrist band and supplemental tongue and identification tag constitute a bracelet. The movement of the bracelet creates an audible reminder to the care giver.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved car seat reminder system which has all of the advantages of the prior art car seat systems of known designs and configurations and none of the disadvantages.

It is another object of the present invention to provide a new and improved car seat reminder system which may be easily and efficiently manufactured and marketed.

It is further object of the present invention to provide a new and improved car seat reminder system which is of durable and reliable constructions.

An even further object of the present invention is to provide a new and improved car seat reminder system which is susceptible of a low cost of manufacture with regard to both materials and labor, and which accordingly is then susceptible of low prices of sale to the consuming public, thereby making such car seat reminder system economically available to the buying public.

Even still another object of the present invention is to provide a car seat reminder system for insuring the use of child car seats by care providers in a safe, convenient and economical manner.

Lastly, it is an object of the present invention to provide a new and improved car seat reminder system. A supplemental tongue is fabricated of a rigid material. The supplemental tongue has upper and lower ends. The supplemental tongue is positionable within a slot of a child car seat. The supplemental tongue has a recess. The recess is provided adjacent to the lower end. The recess has a lower linear edge. In this manner the supplemental tongue is retained within the slot. A wrist band is provided in a loop. The loop forms an opening for a wrist. The wrist band is coupled to the tongue.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
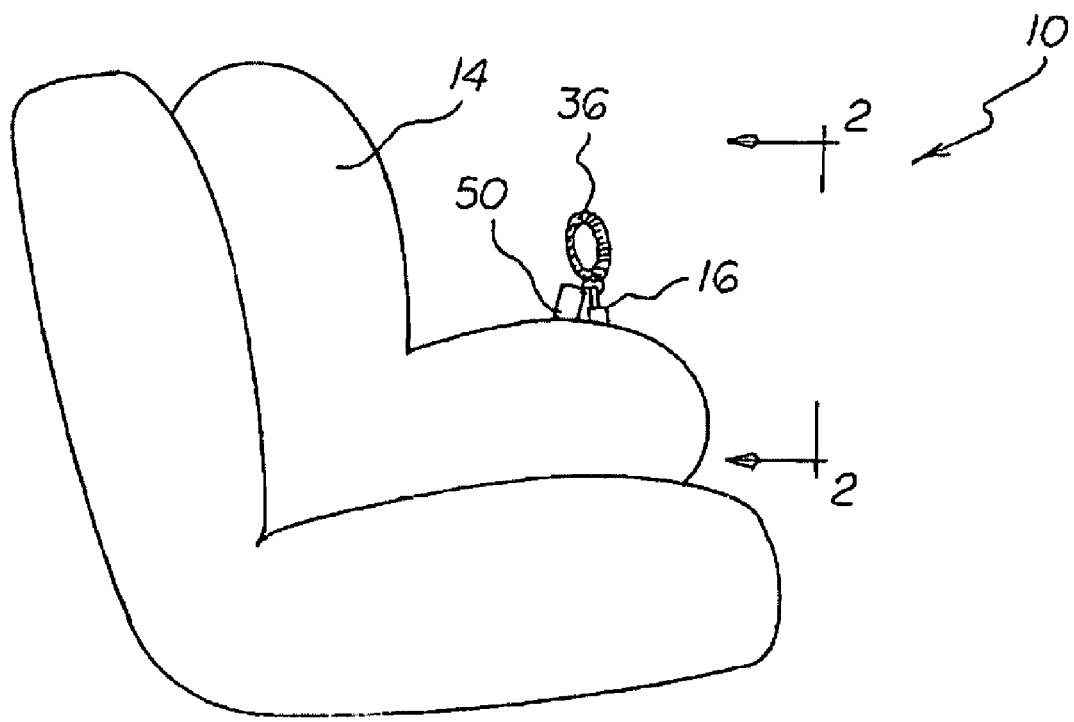
FIG. 1 is a side elevational view of a car seat reminder system constructed in accordance with the principles of the present invention.
Figure 2:
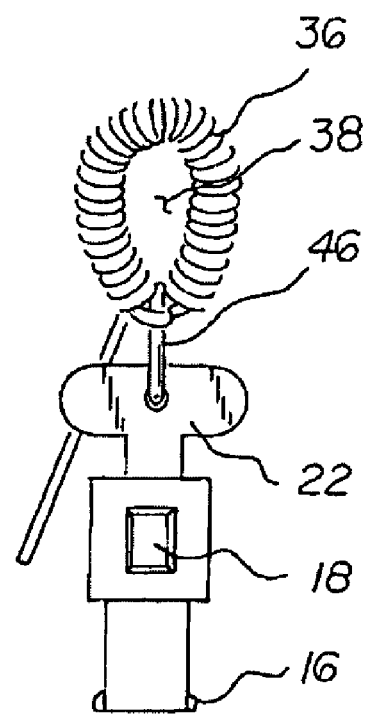
FIG. 2 is a front elevational view of the system taken along line 2-2 of FIG. 1 with the supplemental tongue in the slot.
Figure 3:
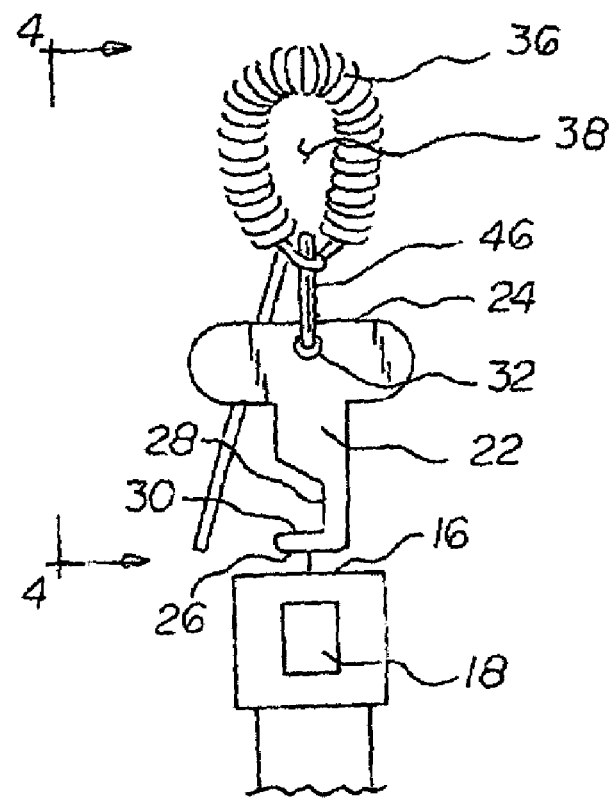
FIG. 3 is an exploded front elevational view of the car seat reminder system similar to FIG. 2 but with the supplemental tongue out of the slot.
Figure 4:
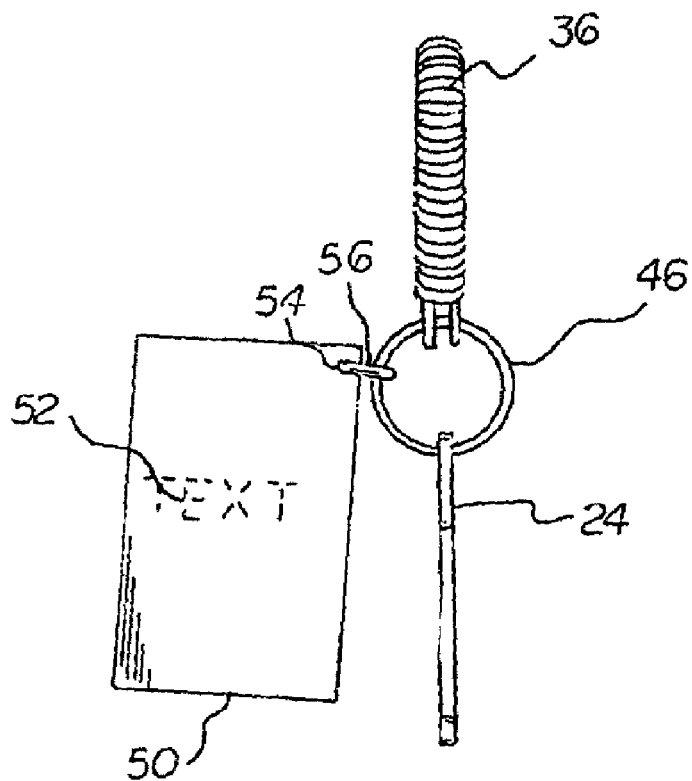
FIG. 4 is a side elevational view of the system taken along line 4-4 of FIG. 3.
Figure 5:
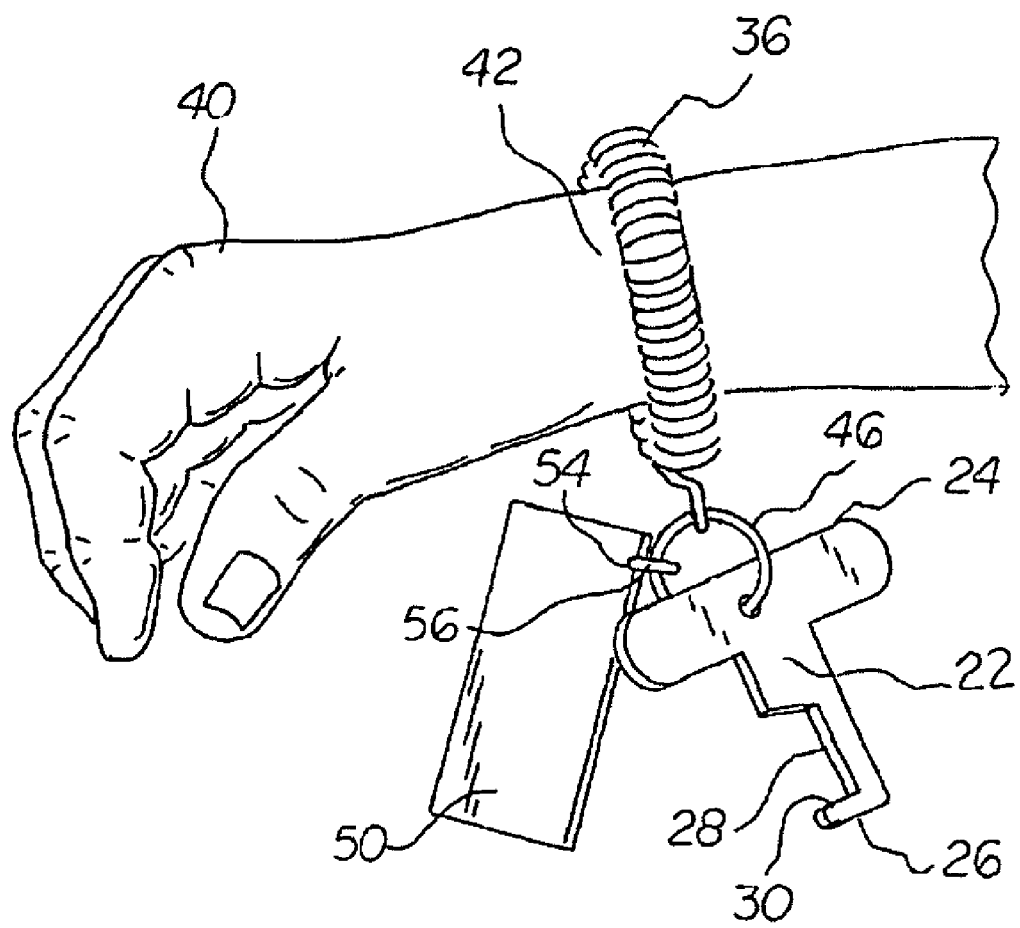
FIG. 5 is a perspective showing of the system of the prior Figures illustrated on the wrist of a user.

With reference now to the drawings, and in particular to FIG. 1 thereof, the preferred embodiment of the new and improved car seat reminder system embodying the principles and concepts of the present invention and generally designated by the reference numeral 10 will be described.

The present invention, the car seat reminder system 10 is comprised of a plurality of components. Such components in their broadest context include a supplemental tongue and wrist band.

Such components are individually configured and correlated with respect to each other so as to attain the desired objective.

First provided is a child car seat 14. The car seat is adapted to receive and support a child in a vehicle. The car seat has a slot 16. The slot is adapted to removably receive a primary tongue at an end of a seat belt. In this manner a child is safely retained in the child car seat. The slot has an associated button 18. The button is adapted to be depressed by a care provider. In this manner a primary tongue is released at an end of a seat belt. Further in this manner a child is allowed to be secured to and released from the child car seat.

A supplemental tongue 22 is provided. The supplemental tongue is removably positionable in the slot when a child is not in the child car seat. The supplemental tongue is fabricated of a rigid metallic material. The supplemental tongue has an upper end 24. The supplemental tongue has a lower free end 26. The supplemental tongue is positionable within the slot by a care provider. The supplemental tongue has a recess 28. The recess is provided adjacent to the lower free end. The recess has a lower linear edge 30. The recess is co-operable with the button. In this manner the supplemental tongue is retained within the slot when the button is not depressed. The supplemental tongue has a central hole 32. The central hole is provided adjacent to the upper end.

Provided next is a wrist band 36. The wrist band is constructed of a spiraled resilient, flexible material. The spiraled wrist band is provided in a loop shaped configuration. The spiraled loop forms an opening 38. The wrist band is adapted to be stretched. A hand 40 of a care giver is provided. A wrist 42 of a care giver is provided. In this manner the wrist band may be stretched over the hand of a care giver while donning onto the wrist and while removing from the wrist.

Further provided is a rigid ring 46. The rigid ring passes through the opening of the wrist band and the hole in the supplemental tongue. In this manner the supplemental tongue is coupled to the wrist band. In this manner the wrist band is adapted to be removed from a wrist of a care giver and the supplemental tongue inserted into the slot when the child car seat is not occupied by a child. In this manner the supplemental tongue is adapted to be removed from the slot. Also in this manner the wrist band is adapted to be positioned onto a wrist of a care giver when the child car seat is occupied by a child. Further in this manner the care giver is reminded in a tactile manner that a child is in the child car seat and not to be left unattended.

Provided last is an identification tag 50. The identification tag has indicia text 52. The indicia text is provided on at least one surface. The identification tag has a corner hole 54. The identification tag has a secondary ring 56. The secondary ring extends through the rigid ring and the corner hole. In this manner the identification tag is coupled to the wrist band. The wrist band and supplemental tongue and identification tag constitute a bracelet. The movement of the bracelet creates an audible reminder to the care giver.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A car seat reminder system for insuring the use of child car seats by care providers in a safe, convenient and economical manner comprising, in combination:

a child car seat adapted to receive and support a child in a vehicle, the car seat having a slot for safely retaining a child in the child car seat, the slot having an associated button adapted to be depressed by a care provider for allowing a child to be secured to and released from the child car seat;

a tongue removably positionable in the slot when a child is not in the child car seat, the tongue being fabricated of a rigid metallic material with an upper end and a lower free end positionable within the slot by a care provider, the tongue being formed with a recess adjacent to the lower free end, the recess having a lower linear edge co-operable with the button to retain the supplemental tongue within the slot when the button is not depressed, the tongue being formed with a central hole adjacent to the upper end;

a wrist band constructed of a spiraled wire of a resilient material in a loop shaped configuration for forming an opening, the wrist band adapted to be stretched for passage over a hand of a care giver while donning onto a wrist and while removing from a wrist;

a rigid ring passing through the opening of the wrist band and the hole in the tongue for coupling the tongue to the wrist band whereby the wrist band is adapted to be removed from a wrist of a care giver and the tongue inserted into the slot when the child car seat is not occupied by a child and whereby the tongue is adapted to be removed from the slot and the wrist band is adapted to be positioned onto a wrist of a care giver when the child car seat is occupied by a child as a reminder to the care giver that a child is in the child car seat and not to be left unattended; and an identification tag with indicia text on at least one surface, the identification tag being formed with a corner hole and including a secondary ring extending through the rigid ring and the corner hole to couple the identification tag to the wrist band, the wrist band and tongue and identification tag constituting a bracelet.

* * * * *